United States Patent [19]

Suzuki et al.

[11] Patent Number: 4,894,779

[45] Date of Patent: Jan. 16, 1990

[54] TRANSLATING APPARATUS

[75] Inventors: Hitoshi Suzuki; Shinobu Shiotani; Shinji Tokunaga, all of Nara; Tokuyuki Hirai, Yamatokoriyama; Yoji Fukumochi, Nara; Shuzo Kugimiya, Nara; Ichiko Sata, Nara, all of Japan

[73] Assignee: Sharp Kabushiki Kaisha, Osaka, Japan

[21] Appl. No.: 125,365

[22] Filed: Nov. 25, 1987

[30] Foreign Application Priority Data

Nov. 28, 1986 [JP] Japan .................................. 61-284490
Nov. 28, 1986 [JP] Japan .................................. 61-284492
Nov. 28, 1986 [JP] Japan .................................. 61-284494

[51] Int. Cl.$^4$ ............................................. G06F 15/38
[52] U.S. Cl. ..................................... 364/419; 364/900; 434/157
[58] Field of Search ....................... 364/419, 200, 900; 434/157

[56] References Cited

U.S. PATENT DOCUMENTS 4,599,612  7/1986  Kaji et al. ........................ 364/419
4,633,435  12/1986 Morimoto et al. ................. 364/419

FOREIGN PATENT DOCUMENTS

0195664  10/1985  Japan ................................. 364/419
0190511  8/1986  Japan ................................. 364/419

Primary Examiner—Jerry Smith
Assistant Examiner—Kim Thanh Tbui
Attorney, Agent, or Firm—Birch, Stewart, Kolasch & Birch

[57] ABSTRACT

A translating apparatus for translating an input sentence and outputting its translated sentence so as to display the input sentence and the translated sentence, includes a division device for dividing the input sentence at a designated location into a plurality of character-strings, a linking device for linking a plurality of character-strings into the input sentence, and a selection device for selecting one of the division device or the linking device.

2 Claims, 6 Drawing Sheets

◇ I am a boy and she is a girl.　　私は少年である、そして、彼女は少女である。

Fig. 3b

◇ I am a boy.// and she is a girl.　　私は少年である、そして、彼女は少女である。

Fig. 3c

◇ I am a boy.　　私は少年である、そして、彼女は少女である。

◇ and she is a girl.

Fig. 4a

◇ I am a boy.　　私は少年である。

◇ She is a girl.　　彼女は少女である。

Fig. 4b

◇ I am a boy. She is a girl.　　私は少年である。彼女は少女である。

TRANSLATING APPARATUS

BACKGROUND OF THE INVENTION

The present invention generally relates to machine translation and more particularly, to a translating apparatus which enables division and linking of sentences through easy operations.

Conventionally, in translating apparatuses, it has been usually so arranged that one complete sentence is fed into a translation processing buffer such that the sentence fed into the translation processing buffer is translated. Thus, in the case where two or more sentences exist in the translation processing buffer or only a portion of a sentence, i.e. an incomplete sentence exists in the translation processing buffer, satisfactory translation of the sentences and the incomplete sentence cannot be performed. In order to obtain a translation of a desired sentence from the input sentences in the former case, it is necessary to delete the excessive sentences and then, perform translation of the desired sentence again. Meanwhile, in the latter case, it is necessary to add an omitted portion to the incomplete sentence into one complete sentence and then, perform translation of the sentence again. Hence, the known machine translating apparatuses have such a drawback that extremely troublesome operations including recovery of the translated input sentence and the input sentences following the translated input sentence, such as further input of the deleted sentences and deletion of the excessive character-string should be performed.

Meanwhile, in the known translating apparatuses in which one sentence is translated as a unit of translation, when a text inputted automatically by an alphanumeric recognition system such as an optical character reader (OCR) or sentences called from another document file are translated, such phenomena as failure of entry of the sentences into translation, erroneous analysis and divided translation due to failure of analysis take place since a plurality of the sentences are arranged continuously without line feed.

Furthermore, in the known translating apparatuses, in order to execute translation and edit the translated sentences, a word processor function of the translating apparatuses is utilized or word processors are exclusively used therefor. However, such cases frequently occur in which the translated sentences can be changed into better ones merely by displacing the phrases without the need for utilizing the word processor function or the word processors exclusively therefor.

SUMMARY OF THE INVENTION

Accordingly, an essential object of the present invention is to provide a translating apparatus which enables division and linking of input sentences through easy operations in order to not only reduce a translating time but improve operating efficiency of the translating apparatus, with substantial elimination of the disadvantages inherent in conventional translating apparatuses of this kind.

Another important object of the present invention is, with a view to solving a problem that sentences inputted continuously cannot be translated correctly, to provide a translating apparatus which has a function of separating the continuous sentences into separate sentences and performing line feed of the separate sentences through their fetch.

Still another object of the present invention is to provide a translating apparatus in which software enabling remarkably easy displacement of phrases or sentences in translated sentences is incorporated in a translating program such that the translated sentences can be edited easily and rapidly.

In order to accomplish these objects of the present invention, there is provided a translating apparatus for translating an input sentence and outputting its translated sentence, which displays the input sentence and the translated sentence, the improvement comprising: a division means for dividing the input sentence at a designated location into a plurality of character-strings; a linking means for linking a plurality of designated character-strings into the input sentence; and a selection means for either of said division means or said linking means.

BRIEF DESCRIPTION OF THE DRAWINGS

These objects and features of the present invention will become apparent from the following description taken in conjunction with the preferred embodiments thereof with reference to the accompanying drawings, in which:

FIGS. 11(a) to 11(c) show a concrete example of processing of the translating apparatus of FIG. 9.

Before the description of the present invention proceeds, it is to be noted that like parts are designated by like reference numerals throughout several views of the accompanying drawings.

DETAILED DESCRIPTION OF THE INVENTION

Figure 1:
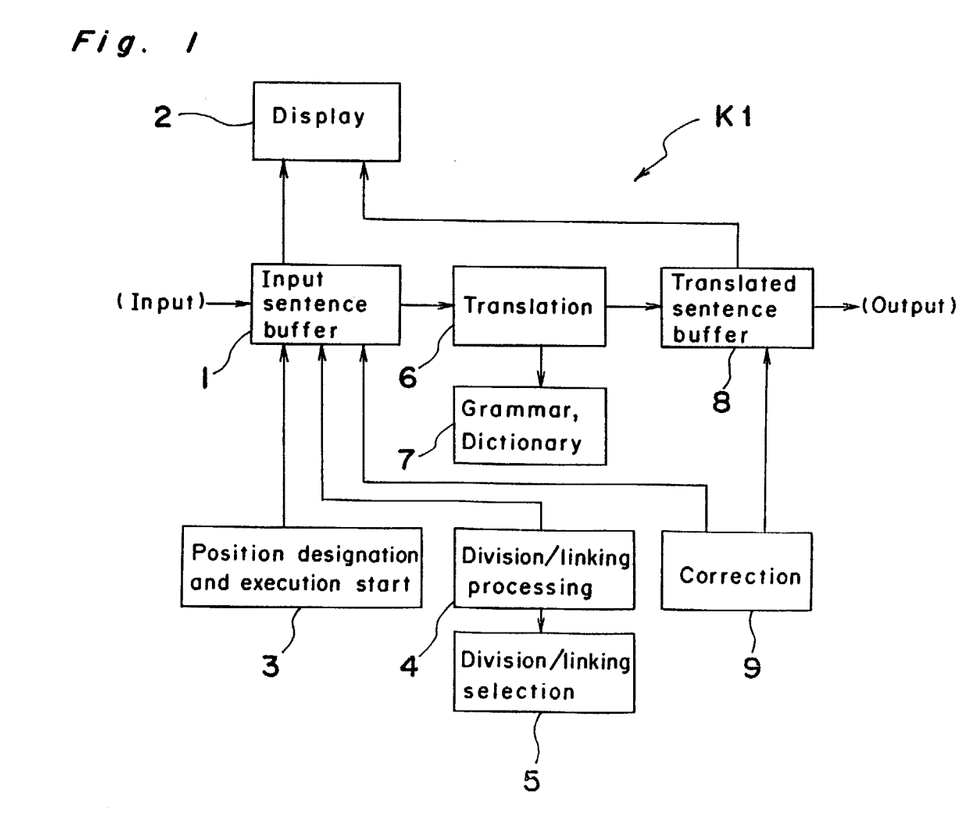
FIG. 1 is a block diagram of a translating apparatus according to a first embodiment of the present invention.

Referring now to the drawings, there is shown in FIG. 1, a translating apparatus K1 according to a first embodiment of the present invention. In FIG. 1, reference numeral 1 denotes an input sentence buffer for storing input sentences (text) inputted by keys or an optical character reader (OCR) or through calling f files. Meanwhile, reference numeral 2 denotes a display portion (CRT display unit) for displaying the input sentences inputted to the input sentence buffer 1. Reference numeral 3 denotes a position designating and execution starting portion for designating divisional positions of the input sentences not only inputted to the input sentence buffer 1 but displayed by the display portion 2 at the time of divisional processing and for designating a plurality of sentences to be linked in the input sentences at the time of linking processing.

In this embodiment, when the divisional positions in the input sentences are designated, key input of "//" is performed. Namely, a "/" (diagonal) key on a keyboard (not shown) is tapped twice in succession. It is to be noted that every keyboard based on Japanese Industrial Standards (JIS) should be provided with the "/" key. Meanwhile, in order to designate positions of the sentences, a cursor key is used not only for divisional processing but for linking processing. A specific function key is allocated to a means for commanding start of execution of a divisional function and a linking function of the translating apparatus K1 after designation of the position for division or linking and is referred to as a "start key", hereinbelow.

In response to operation of the above described start key, a division/linking processing portion 4 for performing divisional processing and linking processing begins operation. Meanwhile, prior to execution of the division/linking processing portion 4, a division/linking selecting portion 5 for selecting one of divisional processing and linking processing searches for the "//" mark in a sentence placed on a cursor so as to select one of divisional processing and linking processing. Therefore, the division/linking processing portion 4 executes divisional processing or linking processing on the basis of selection of the division/linking selecting portion 5.

Reference numeral 6 designates a translation portion for translating the input sentences stored in the input sentence buffer 1. The translation portion 6 is constituted by a dictionary look-up portion, a morphological analysis portion, a syntactic analysis portion, a conversion portion and a generation portion. When a source language has been inputted to the translation portion 6, the dictionary look-up portion looks up a dictionary for translation so as to obtain grammatical information on a part of speech, etc. and a translation for each word in the source language. Then, the morphological analysis portion analyzes tense, person, number, etc. of each word from the grammatical information and the translation obtained by the dictionary look-up portion. Subsequently, the syntactic analysis portion determines a sentence structure such as syntactic relations among words of the source language, whereby an internal structure of the source language is obtained. Thereafter, the conversion portion converts the internal structure of the source language into an internal structure of a target language. Then, the generation portion generates the target language.

Meanwhile, grammatical rules and the dictionary for translation are stored in a table 7 such that the translation portion 6 translates the source language by referring to the table 7. It can also be so arranged that the translation portion 6 is further provided with a semantic analysis portion, a context generation portion and a semantic generation portion in addition to the portions referred to above. After translation of the source language, the translation portion 6 outputs a translated sentence (a translated result) corresponding to the input sentence. The outputted translated result not only is stored in a translated sentence buffer 8 but is displayed by the display portion 2.

In FIG. 1, reference numeral 9 denotes a correction portion 9 for correcting the input sentences stored in the input sentence buffer 1 and the translated sentences stored in the translated sentence buffer 8.

Figure 2:
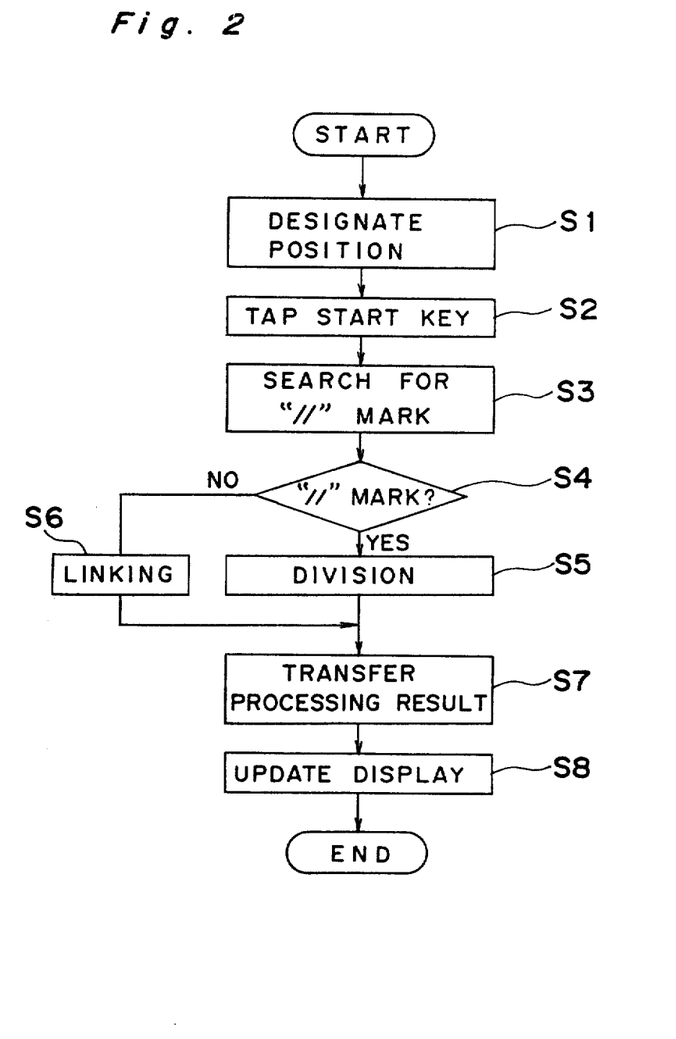
FIG. 2 is a flow chart showing a processing sequence of the translating of FIG. 1.

Hereinbelow, a processing sequence of the translating apparatus K1 is described with reference to a flow chart of FIG. 2. As described above, it is assumed that the sentences to be translated have been inputted to and stored in the input sentence buffer 1 and are displayed in the display portion 2. Initially, at step S1, the operator designates a position for dividing a sentence or linking sentences by watching the contents of display of the display portion 2. In the case of divisional processing, the operator inserts the "//" mark at a desired position of the sentence to be divided. An arbitrary number of the "//" marks can be inserted in the sentence to be divided. Furthermore, in the case of divisional processing, the cursor is displaced into the sentence to be divided.

Meanwhile, in the case of linking processing, the cursor is placed in a leading one of the sentences to be linked.

After the position for division or linking has been designated as described above, the start key for starting divisional processing or linking processing is tapped at step S2. Then, at step S3, the division/linking selecting portion 5 searches for the "//" mark in the sentence in which the cursor is placed. If it is found at step S4 that the "//" mark exists in the sentence, the division/linking processing portion 4 executes divisional processing at step S5. On the contrary, if it is found at step S4 that the "//" mark does not exist in the sentence, the division/linking processing portion 4 executes linking processing at step S6. When divisional processing is performed at step S5, the sentence is divided into a plurality of sentences with each "//" mark as the sentence boundary. On the other hand, when linking processing is performed at step S6, the leading sentence placed on the cursor and a sentence disposed immediately below the leading sentence are linked with each other into one new sentence. These processing results are transferred to the input sentence buffer 1 and the translated sentence buffer 8 at step S7. Then, at step S8, the contents of display of the display portion 2 are updated in accordance with the contents of the processing results stored in the input sentence buffer 1 and the translated sentence buffer 8.

Figure 3A:
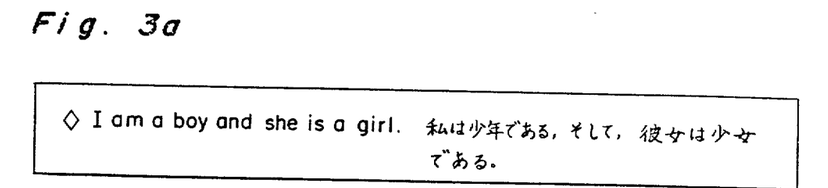
FIGS. 3a, 3b and 3c are views indicative of displays at the time of divisional processing of the translating apparatus of FIG. 1.
Figure 3B:
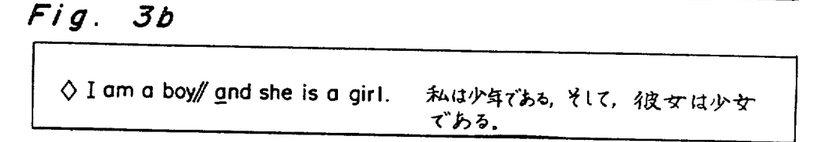
Figure 3C:
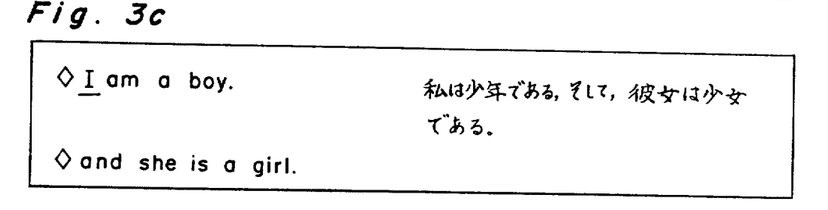

FIGS. 3a, 3b and 3c show an example of displays at the time of divisional processing of the translating apparatus K1. In FIG. 3a, the left portion indicates an input sentence (English) and the right portion indicates its translated sentence (Japanese). A set of the input sentence and the translated sentence are separated from another set by a "◇" mark in FIG. 3a. Initially, the "//" mark is inserted at a desired position of the input sentence to be divided as shown in FIG. 3b. Then, when the start key is depressed, the input sentence is divided into two sentences as shown in FIG. 3c.

Figure 4A:
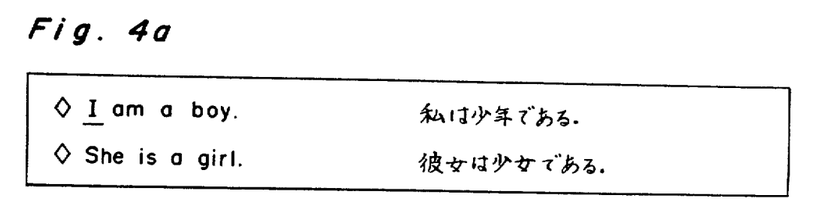
FIGS. 4a and 4b are views indicative of displays at the time of linking processing of the translating apparatus of FIG. 1.
Figure 4B:
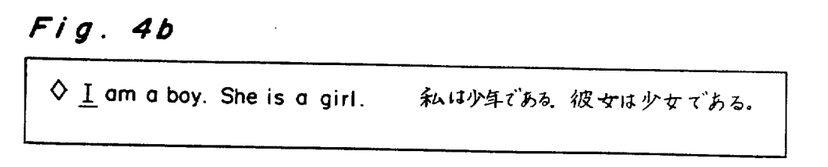

Meanwhile, FIGS. 4a and 4b show an example of displays at the time of linking processing of the translating apparatus K1. In FIG. 4a, the left portion depicts two input sentences (English) and the right portion depicts the corresponding translated sentences (Japanese). A set of an upper input sentence and its translated sentence are separated from a set of a lower input sentence and its translated sentence by the "◇" mark in FIG. 4a. Initially, the cursor is placed in the upper input sentence to be linked with the lower input sentence as shown in FIG. 4a. Then, when the start key is depressed, the lower sentence disposed below the upper sentence having the cursor placed therein is linked with the upper sentence into a new sentence as shown in FIG. 4b. As shown in FIG. 4b, the upper and lower translated sentences are also linked with each other.

As described above, in the translating apparatus according to the first embodiment of the present invention, divisional processing and linking processing can be performed by easy operations. Namely, in the case of division of a sentence, it is only necessary to designate a position of division in the sentence and then, place the cursor in the sentence. Meanwhile, in the case of linking of sentences, it is only necessary to place the cursor in a leading one of the sentences and tap the function key once.

Meanwhile, in the translating apparatus of the present invention, since an operation for recovering the translated input sentence and the input sentences following the translated input sentence is not required to be performed, the number of key inputs is reduced sharply.

Furthermore, in divisional processing, it is conveniently possible to divide one sentence into a plurality of sentences by one operation.

Moreover, even if opposite processing is performed inadvertently, it is easy to recover sentences to their original state by utilizing the linking function against the divisional function and the divisional function against the linking function.

In addition, the translating apparatus of the present invention complies with input of an OCR. Even if input sentences having obscure sentence boundaries are stored in the input sentence buffer by input from the OCR, it is possible to easily rewrite the sentences into a form suitable for translation by division and linking of the sentences.

Furthermore, in the case where a long time period is required for translating a long sentence as it is, it will be better to translate the sentence after dividing the sentence into a plurality of sentences properly. At this time, the translating apparatus of the present invention is suitable for editing the input sentence.

As will be seen from the foregoing description, the translating apparatus of the present invention has the divisional function of dividing one complete character-string in input sentences into a plurality of character-strings at a location designated by the operator and the linking function of linking a plurality of character-strings designated by the operator into one complete character-string such that one of the divisional function and the linking function can be selectively executed. Accordingly, the translating apparatus of the present invention has the following effects (a) and (b).

(a) In the case where an input sentence is long, it becomes possible to translate the sentence after dividing the sentence into a plurality of sentences. Therefore, through improvement of operating efficiency of translation, the translating apparatus of the present invention can promptly deal with such cases where a complicated sentence is translated after its division into a plurality of sentences, where a long sentence is translated after its division into a plurality of sentences and its change into simpler expressions and where two or more sentences are inputted to a location for receiving one sentence (for example, the buffer of one sentence separated from another sentence by the "◊" mark in FIG. 3) for one cause or another, e.g. due to erroneous input.

(b) It is possible to link a plurality of sentences into one sentence. Therefore, this linking function can be conveniently used for changing expressions of the input sentences and linking again the sentences translated by using the divisional function.

Figure 5:
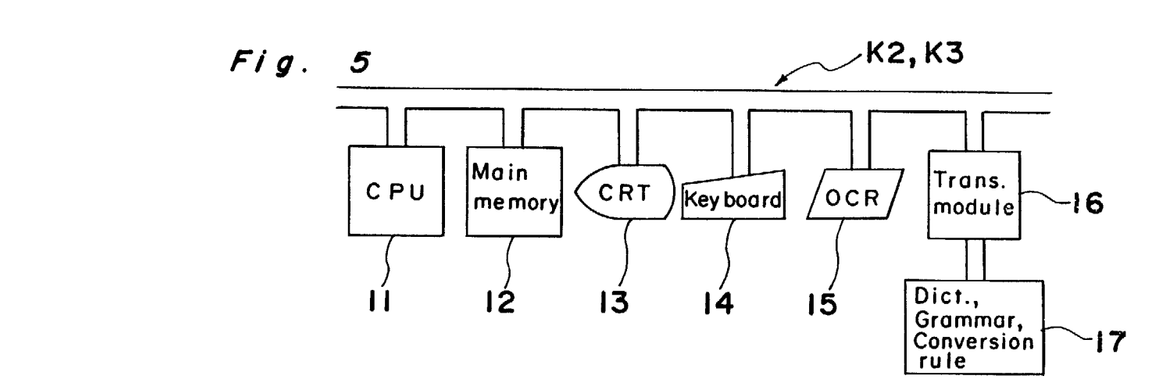
FIG. 5 is a block diagram of translating apparatuses according to second and third embodiments of the present invention.

Referring to FIG. 5, there are shown translating apparatuses K2 and K3 according to second and third embodiments of the present invention, respectively. It is to be noted that the translating apparatus K2 is provided with a means for separating sentences inputted continuously, into separate sentences and performing line feed of the separate sentences, while the translating apparatus K3 has a function of displacing phrases of sentences so as to edit the sentences. The translating apparatuses K2 and K3 include a central processing unit (CPU) 11, a main memory 12, a CRT display unit 13, a keyboard 14, an OCR 15, a translation module 16 and a table 17 for storing a dictionary for translation, grammatical rules and tree structure conversion rules.

Figure 6:
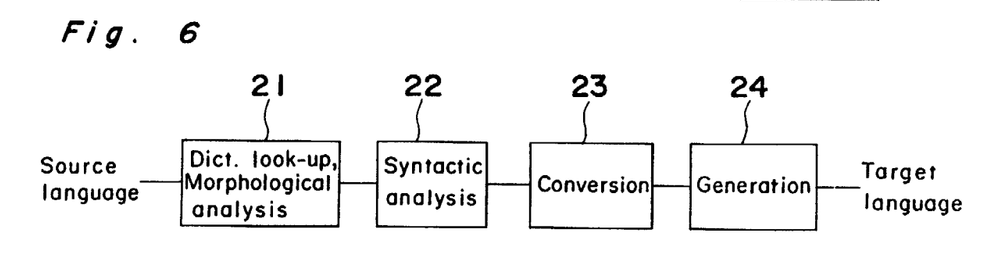
FIG. 6 is a view indicative of an arrangement of a translation module employed in the translating apparatuses of FIG. 5.

An arrangement of the translation module 16 is shown in FIG. 6. The translation module 16 is constituted by a dictionary look-up and morphological analysis portion 21, a syntactic analysis portion 22, a conversion portion 23 and a generation portion 24. The dictionary look-up and morphological analysis portion 21 looks up the dictionary for translation so as to obtain grammatical information on a part of speech, etc. and a translation for each word in a source language and analyzes tense, person, number, etc. of each word from the grammatical information and the translation. Then, the syntactic analysis portion 22 determines a sentence structure such as syntactic relations among words of the source language, whereby an internal structure of the source language is obtained. Then, the conversion portion 23 converts the internal structure of the source language into an internal structure of a target language, which has a level identical with that of the source language. Based on the internal structure of the target language obtained by the conversion portion 23, the generation portion 24 generates the target language.

Figure 7:
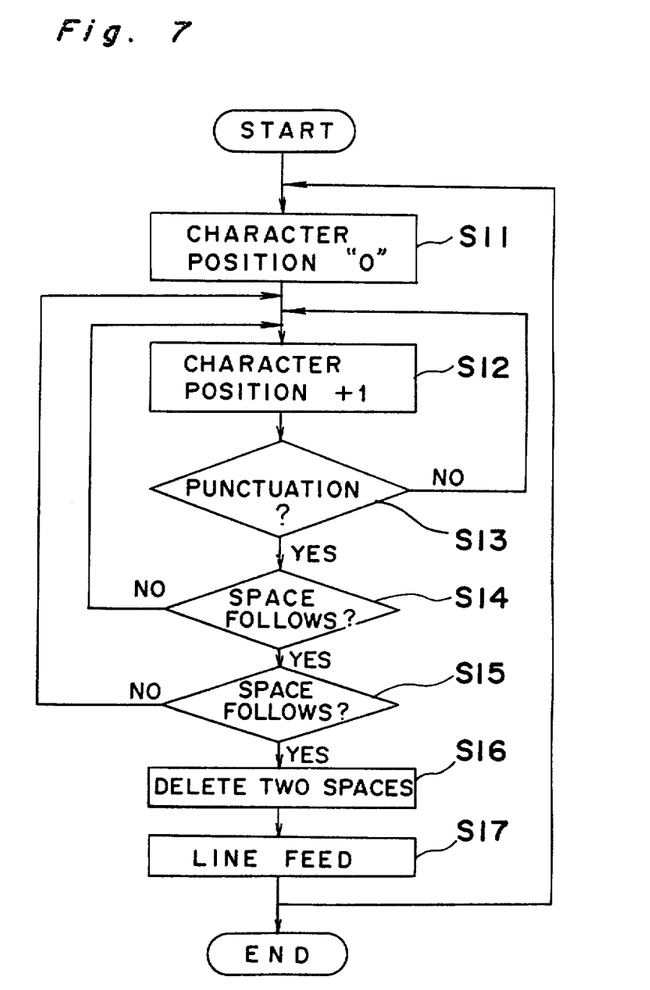
FIG. 7 is a flow chart showing a processing sequence of the translating apparatus according to the second embodiment of the present invention of FIG. 5.
Figure 8:
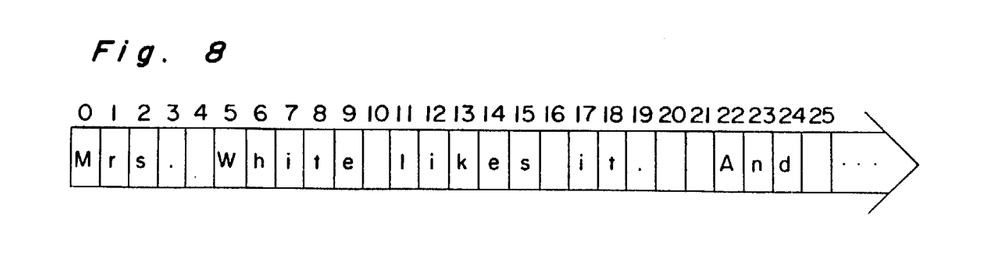
FIG. 8 is a view showing a sentence inputted in the translating apparatus of FIG. 7.

Hereinbelow, a processing sequence of the translating apparatus K2 is described with reference to a flow chart of FIG. 7 on the assumption that a character-string "Mrs. White likes it. And ---" has been inputted to the translating apparatus K2 as shown in FIG. 8. At step S11, the inputted leading character "M" is set at a character number (character position) "0" and serial numbers (character numbers) are, respectively, allotted to the characters following the leading character "M". Then, at step S12, one is added to the character number "0". Subsequently, a decision is made at step S13 as to whether or not the character corresponding to the increased character number is one of punctuation marks such as ".", "!", "?", etc. At this time, a character code of the character is compared with those of the punctuation marks so as to make a decision at step S 13. Since the character "r" of the character number "1" is not one of the punctuation marks, the program flow returns from step S13 to step S12. The character number is counted by a counter. When the character "." (period) of the character number "3" is detected at step S13, the program flow proceeds to step 14. At step 14, a decision is made as to whether or not the character following the character found to be one of the punctuation marks at step S13 is a space. Namely, at step S14, upon increment, by one, of the counter for counting the character number, a decision is made as to whether or not a character code of the character number increased by one is identical with a space code. Since the character of the character number "4" following the character "." of the character number "3" is a space as shown in FIG. 8, the program flow proceeds from step S14 to step S15 at which a decision is made as to whether or not the character following the character found to be a space is a space. Namely, at step S15, upon increment, by one, of the counter for counting the character number, a decision is made as to whether or not a character code of the character number increased by one is identical with a space code. Since the character of the character number "5" following the space of the character number "4" is "W", a decision of "NO" is made at step S15 and thus, the program flow returns to step S12. Subsequently, the same processing as described above is repeated.

As a result, the character "." (period) of the character number "19" is detected at step S13 and thus, the program flow proceeds from step S13 to step S14. Since the character of the character number "20" following the character "." of the character number "19" is a space, the program flow proceeds from step S14 to step S15. Meanwhile, since the character of the character number "21" following the space of the character number "20" is also a space, the program flow proceeds from step S15 to step S16. At step S16, the two spaces of the character numbers "20" and "21" detected by steps S14 and S15 are deleted. Subsequently, at step S17, line feed is performed. Thus, the character-string "And ---" of the character numbers "22" and more is placed at the next line of the character-string "Mrs. White likes it." of the character numbers 0-19. After line feed of step S17, the program flow returns to step S11 again and the same processing as described above is repeated.

As can be seen from the description given so far, the translating apparatus according to the second embodiment of the present invention in which one sentence is translated as a unit of translation includes the means for separating sentences inputted continuously, into separate sentences and performing line feed of the separate sentences. Therefore, a large amount of a text inputted automatically from an alphanumeric recognition system such as an OCR or sentences called from a document file prepared separately can be translated by the translating apparatus according to the second embodiment of the present invention without the need for performing manual line feed. As a result, the input operations are made remarkably easier and the input time period is reduced drastically, thereby resulting in improvement of efficiency of translation.

Figures 9, 10, 11:
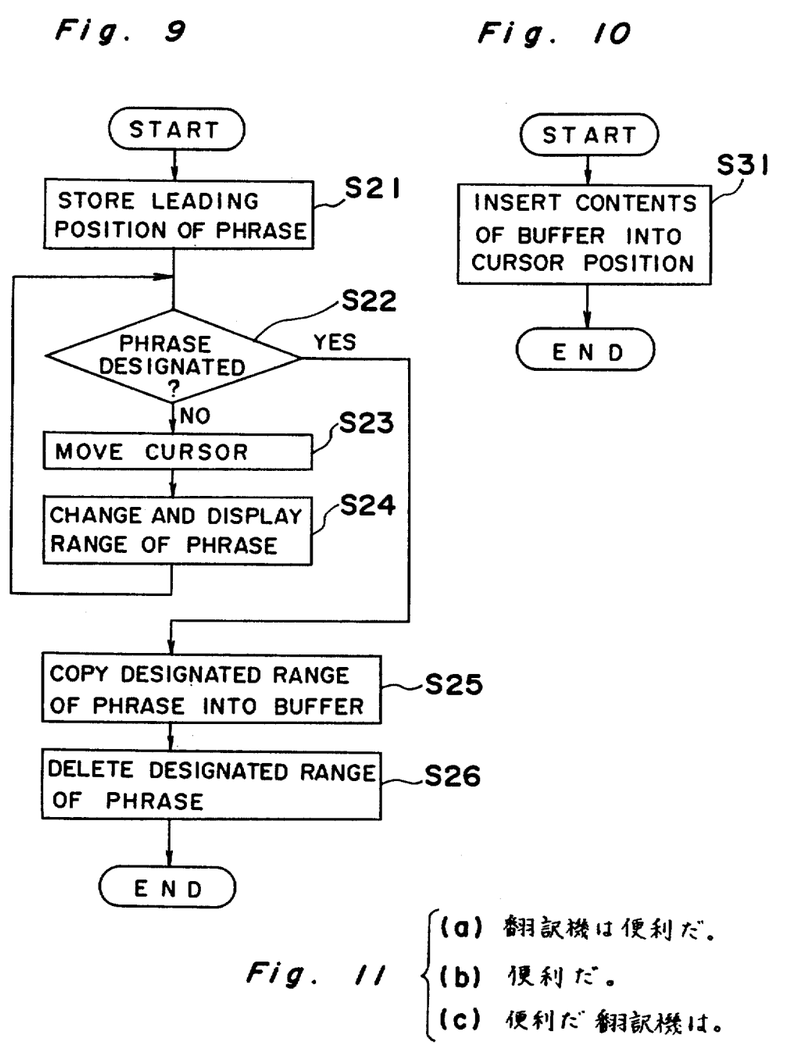
FIGS. 9 and 10 are flow charts showing processing sequences of the translating apparatus according to the third embodiment of the present invention of FIG. 5.

Hereinbelow, a processing sequence of the translating apparatus K3 according to the third embodiment of the present invention is described with reference to flow charts of FIGS. 9 and 10. Since the function of displacing phrases of sentences is used after completion of translation in the translating apparatus K3, it is supposed here that the program is in a state of completion of translation. In this state, a translation of each word is stored in a buffer (referred to as a "translation buffer", hereinbelow).

In the case where the phrases are displaced, a process of displacing a portion of the translation buffer to a temporary buffer to store the portion of the translation buffer in the temporary buffer and a process of recovering contents of the temporary buffer at an arbitrary position of the translation buffer occurs. Hereinbelow, the former and latter process are referred to as a "phrase storing processing" and "phrase recovering processing", respectively. FIGS. 9 and 10 are, respectively, directed to the phrase storing processing and the phrase recovering processing.

The phrase storing processing is described with reference to the flow chart of FIG. 9. Initially, at step S21, a leading position of a phrase is stored. Namely, at step S21, a pointer corresponding to the leading position of the phrase in the translation buffer is stored. Then, at step S22, a decision is made as to whether or not designation of the phrase has been completed. In the case of "NO" at step S22, the program flow proceeds from step S22 to step S23 at which a range of the phrase is designated by displacing a cursor key. Then, at step S24, a pointer indicative of an end of the phrase is changed in the translation buffer in response to displacement of the cursor. Namely, at step S24, the range of the phrase is changed and displayed. Subsequently, the program flow returns to step S22. Thereafter, until designation of the phrase is completed, a loop processing from and to step S22 by way of steps S23 and S24 is repeated.

Thus, if it is found at step S22 that designation of the phrase has been completed, the program flow proceeds to step S25 at which the designated range of the phrase is copied into the temporary buffer. Namely, at step S25, the phrase from its leading position to its end in the translation buffer is copied into the temporary buffer, with the leading position and the end of the phrase being indicated by the pointers, respectively. Then, the program flow proceeds to step S26 at which the designated range of the phrase is deleted. Namely, at step S26, a portion of the contents in the translation buffer, which follows the pointer indicating the end of the phrase, is displaced to the pointer indicating the leading position of the phrase. Then, the processing result is displayed by the CRT display unit 13.

By the above described processing, the designated range of the phrase is deleted on the CRT display unit 13 and is stored in the temporary buffer.

The phrase recovering processing is described with reference to the flow chart of FIG. 10. In FIG. 10, at step S31, the contents of the temporary buffer are inserted into the position of the cursor. Namely, at step S31, the portion of the contents in the translation buffer, which follows the pointer corresponding to the cursor is displaced backwards by a size of the contents of the temporary buffer and the contents of the temporary buffer are copied at the position of the pointer, whereby displacement of the phrase is completed.

Hereinbelow, a concrete example of displacement of the phrase is described with reference to FIGS. 11(a) to 11(c). It is assumed here that a Japanese translation meaning "A translating apparatus is convenient." has been obtained as shown in FIG. 11(a). Thus, the Japanese translation of FIG. 11(a) is processed from step S22 to step S26 by designating a Japanese phrase meaning "A translating apparatus". As a result, the remaining Japanese translation meaning "is convenient", which is obtained by deleting the Japanese phrase meaning "A translating apparatus" from the Japanese translation meaning "A translating apparatus is convenient.", is displayed by the CRT display unit 13 as shown in FIG. 11(b). Subsequently, by performing the phrase recovering processing of the Japanese phrase meaning "A translating apparatus", a new Japanese translation meaning "Convenient is a translating apparatus.", which is different, in word order, from the initial Japanese translation meaning "A translating apparatus is convenient.", is obtained as shown in FIG. 11(c).

Meanwhile, in the third embodiment of the present invention, although displacement of phrases has been described, it can also be so arranged that sentences are displaced.

As will be understood from the foregoing, the translating apparatus for translating an input sentence and outputting its translated sentence, according to the third embodiment of the present invention includes the designation means for designating the predetermined range of the translated sentence and the translation means for translating the input sentence is provided with the displacement means for displacing the designated predetermined range in the translated sentence. Therefore, in accordance with the third embodiment of the present invention, in the case where the translated sentences make sense but it is desirable to rewrite the translated sentences through exchange of the phrases or sentences in view of their context or usage, the operator can displace any phrase or sentence in the translation software by looking at the input sentences and the translated sentences on the screen of the CRT display unit. As a result, operations of the translating apparatus are effectively assisted, thereby extraordinarily alleviating any burden on the operator in operations of the translating apparatus.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as being included therein.

What is claimed is:

1. A translating apparatus for translating an input sentence and outputting its translated sentence, which apparatus displays the input sentence and the translated sentence comprising:

means for dividing the input sentence at a designated location into at least two character-strings, each said character-string being identifiable as a separate sentence;

means for linking a plurality of designated character-strings into the input sentence, each said character string being identifiable as a separate sentence;

means for selecting either one of said means for dividing or said means for linking when viewing one or more input sentences to the translated;

means for continuously inputting a plurality of sentences into the translating apparatus;

means for separating said continuously input plurality of sentences into separate sentences;

means for performing line feed of separate sentences; and means for executing said means for separating prior to translation of the separately designated sentences.

2. The translating apparatus according to claim 1, further including means for executing either of said means for dividing or means for linking subsequent to designating a division or linking location of said character-strings.

* * * * *